(12) United States Patent
Kim

(10) Patent No.: US 10,121,173 B2
(45) Date of Patent: Nov. 6, 2018

(54) METHOD AND APPARATUS FOR TRANSMITTING AND RECEIVING APPLICATION/CONTENT BASED ON PURCHASE INFORMATION

(75) Inventor: Hyung-sik Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 233 days.

(21) Appl. No.: 13/047,451

(22) Filed: Mar. 14, 2011

(65) Prior Publication Data
US 2011/0225236 A1    Sep. 15, 2011

(30) Foreign Application Priority Data

Mar. 12, 2010  (KR) .................. 10-2010-0022430
Feb. 25, 2011  (KR) .................. 10-2011-0017300

(51) Int. Cl.
| | |
|---|---|
| G06F 15/16 | (2006.01) |
| G06F 21/00 | (2013.01) |
| G06Q 30/06 | (2012.01) |
| G06F 21/60 | (2013.01) |
| G06F 21/10 | (2013.01) |
| G06F 8/40 | (2018.01) |
| G06Q 20/12 | (2012.01) |

(52) U.S. Cl.
CPC .......... *G06Q 30/0603* (2013.01); *G06F 8/40* (2013.01); *G06F 21/10* (2013.01); *G06F 21/60* (2013.01); *G06Q 30/0645* (2013.01); *G06Q 20/1235* (2013.01)

(58) Field of Classification Search
USPC .............................. 709/203, 217; 705/50–59
See application file for complete search history.

(56) References Cited

U.S. PATENT DOCUMENTS

| | | | |
|---|---|---|---|
| 7,113,776 B2* | 9/2006 | Minear et al. | ................. 455/419 |
| 8,725,134 B2 | 5/2014 | Zou et al. | |
| 2003/0028490 A1* | 2/2003 | Miura et al. | .................... 705/59 |

(Continued)

FOREIGN PATENT DOCUMENTS

| | | |
|---|---|---|
| CN | 1689299 | 10/2005 |
| CN | 1909557 | 2/2007 |

(Continued)

OTHER PUBLICATIONS

Australian Office Action dated Jul. 9, 2013 issued in counterpart application No. 2011224942.

(Continued)

*Primary Examiner* — Shirley Zhang
(74) *Attorney, Agent, or Firm* — The Farrell Law Firm, P.C.

(57) ABSTRACT

A method and apparatus for sharing information regarding a purchase result between a plurality of clients and receiving at least one of an application and content from a server based on the shared information regarding the purchase result. The method includes receiving information regarding a purchase result of the at least one of the application and the content from a second client; transmitting the information regarding the purchase result and device information of the first client to a server providing the at least one of the application and the content; and receiving the at least one of the application and the content from the server in response to the transmission.

22 Claims, 6 Drawing Sheets

(56) References Cited

U.S. PATENT DOCUMENTS

| | | |
|---|---|---|
| 2004/0181487 A1 | 9/2004 | Hanson |
| 2005/0004875 A1* | 1/2005 | Kontio et al. ............... 705/52 |
| 2006/0015462 A1* | 1/2006 | Doll-Steinberg ............ 705/51 |
| 2006/0064488 A1 | 3/2006 | Ebert |
| 2008/0020867 A1 | 1/2008 | Manwaring |
| 2008/0208607 A1 | 8/2008 | Ma et al. |
| 2009/0287682 A1 | 11/2009 | Nath et al. |
| 2010/0017501 A1* | 1/2010 | Yen ................... G06F 21/10 709/219 |
| 2011/0125601 A1* | 5/2011 | Carpenter et al. ........ 705/26.1 |
| 2016/0315989 A1 | 10/2016 | LaJoie et al. |

FOREIGN PATENT DOCUMENTS

| | | |
|---|---|---|
| CN | 101017552 | 8/2007 |
| CN | 101119387 | 2/2008 |
| CN | 101222456 | 7/2008 |
| JP | 2009-515378 | 4/2009 |
| JP | 2009-217370 | 9/2009 |
| JP | 2011-527465 | 10/2011 |
| KR | 1020030004206 | 1/2003 |
| KR | 1020040019838 | 3/2004 |
| KR | 1020040084483 | 10/2004 |
| KR | 1020070059887 | 6/2007 |
| KR | 1020090036669 | 4/2009 |
| KR | 1020090057946 | 6/2009 |
| WO | WO 2010/001324 | 1/2010 |

OTHER PUBLICATIONS

Japanese Office Action dated Jan. 6, 2015 issued in counterpart application No. 2012-558072.

Japanese Office Action dated Sep. 7, 2015 issued in counterpart application No. 2012-558072, 4 pages.

Chinese Office Action dated Dec. 15, 2015 issued in counterpart application No. 201180013694.7, 15 pages.

Chinese Office Action dated Jun. 21, 2016 issued in counterpart application No. 201180013694.7, 8 pages.

Korean Office Action dated Dec. 6, 2016 issued in counterpart application No. 10-2011-0017300, 12 pages.

Chinese Office Action dated Apr. 3, 2015 issued in counterpart application No. 201180013694.7.

* cited by examiner

METHOD AND APPARATUS FOR TRANSMITTING AND RECEIVING APPLICATION/CONTENT BASED ON PURCHASE INFORMATION

PRIORITY

This application claims priority under 35 U.S.C. §119(a) to Korean Patent Application No. 10-2010-0022430, filed on Mar. 12, 2010, and of Korean Patent Application No. 10-2011-0017300, field on Feb. 25, 2011, in the Korean Intellectual Property Office, the entire contents of which are incorporated herein by reference.

BACKGROUND OF THE INVENTION

1. Field of the Invention

The present invention generally relates to a method and apparatus for transmitting and receiving an application or content, and more particularly, to a method and apparatus for receiving, by a client, the application or content from a server.

2. Description of the Related Art

Internet services in which a developer freely develops and sells an application, such as an application store, for example, which can operate on specific software platforms based on developer kits, are gaining in popularity. Accordingly, there has been increasing interest in methods for purchasing, transmitting, and receiving applications through such services.

SUMMARY OF THE INVENTION

The present invention provides a method and apparatus for transmitting and receiving an application or content between a client and an application server, and a computer-readable recording medium that stores a computer-readable program for executing the method.

According to an aspect of the present invention, a method for receiving, by a client, at least one of an application and content is provided. The method includes receiving information regarding a purchase result of the at least one of the application and the content from a second client; transmitting the information regarding the purchase result and device information of the first client to a server providing the at least one of application and the content; and receiving the at least one of the application and the content from the server in response to the transmission.

According to another aspect of the present invention, a method for providing at least one of an application and content by a server is provided. The method includes receiving, from a first client, information regarding a purchase result of the at least one of the application and the content and device information of the first client, which has received the information regarding the purchase result from a second client; and transmitting the at least one of the application and the content to the first client in response to the received information.

According to another aspect of the present invention, an apparatus for receiving, by a first client, at least one of an application and content is provided. The apparatus includes a purchase information management unit for receiving, from a second client, information regarding a purchase result of the at least one of the application and the content; and an application/content management unit for transmitting the information regarding the purchase result and device information of the first client to a server and receiving the at least one of the application and the content from the server in response to the transmission.

According to another aspect of the present invention, an apparatus for providing, by a server, at least one of an application and content is provided. The apparatus includes a purchase information management unit for receiving information regarding a purchase result regarding the at least one of the application and the content from a first client that has received the information regarding the purchase result from a second client; and a providing unit for transmitting the at least one of the application and the content to the first client based on the information regarding the purchase result and device information of the first client.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE INVENTION

Embodiments of the present invention are described in detail as follows with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
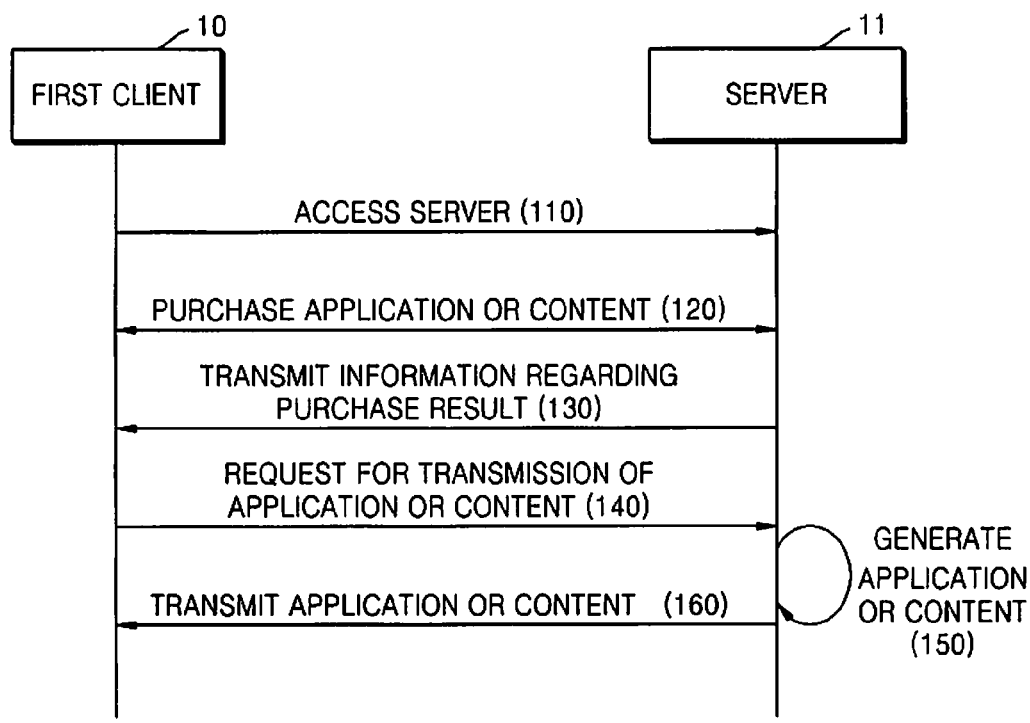
FIG. 1 is a signaling diagram illustrating a method for transmitting and receiving at least one of an application and content, according to an embodiment of the present invention.

FIG. 1 is a signaling diagram illustrating a method for transmitting and receiving an application or content, according to an embodiment of the present invention.

Referring to FIG. 1, in step 110, a first client 10 accesses a server 11 to purchase and receive an application or content. A user of the first client 10 may access the server 11 by logging in with an account that the user has registered in the server 11. Herein, the term "application" refers to software that can be installed in and driven by the first client 10, whereas the term "content" refers to multimedia data that can be reproduced by the first client 10. Various types of content includes an e-book file, a music file, a motion picture file, a still image file, etc.

In step 120, the first client 10 selects and purchases an application or content provided by the server 11. The first client 10 requests for and receives, from the server 11, a list of applications and/or content provided by the server 11, and displays the list to the user of the first client 10. The user of the first client 10 may select a predetermined application or predetermined content from the displayed list through a predetermined input device. If the user of the first client 10 selects a predetermined application or predetermined content, procedures for payment settlement of the selected application or content are performed, and the user of the first client 10 may purchase the selected application or content through various payment settlement methods.

When the first client 10 accesses the server 11 in step 110, device information of the first client 10 may be transmitted to the server 11. In this case, when the application is purchased in step 120, the server 11 may transmit a list of applications that can be installed in and driven by the first client 10, and/or a list of contents that can be reproduced by the first client 10, to the first client 10 with reference to the device information of the first client 10, which has been received in step 110.

According to another embodiment of the present invention, the first client 10 may transmit the device information of the first client 10 to the server 11 when the first client 10 starts the purchase of the selected application or content in step 120, and the server 11 may transmit the list of applications that can be installed in and driven by the first client 10, or the list of contents that can be reproduced by the first client 10, to the first client 10 with reference to the received device information.

The device information of the first client 10 may include information regarding hardware and software influencing installation and driving of the application or reproduction of the content, such as information regarding an Operating System (OS) of the first client 10, information regarding a Central Processing Unit (CPU) of the client 10, and information regarding a memory. The information regarding hardware may include information of the first client 10 indicating a display resolution, supporting languages, support/non-support of a Global Positioning System (GPS), and support/non-support of 3-dimensional graphic acceleration.

In step 130, the server 11 transmits information regarding a result of the purchase performed in step 120 to the first client 10. The information regarding the purchase result may include information indicating an identifier of the application or the content purchased by the first client 10 and a user account used in the purchase. The information regarding the purchase result may also include all information for verifying that the user of the first client 10 has purchased the application or the content through proper procedures.

If the first client 10 has purchased the content, the information regarding the purchase result may be included in a content description that defines the purchased content in detail. The information regarding the purchase result may be included in the content description, which includes, in addition to the identifier of the content, metadata for defining the content, such as a Uniform Resource Locator (URL) of the content, and the server 11 may transmit the content description to the first client 10 in step 130.

In step 140, the first client 10 requests, based on the information received in step 130, the server 11 to transmit the purchased application or content. That is, when the information regarding the purchase result, which was received in step 130, is transmitted from the server 11, the first client 10 requests for transmission of the application or the content purchased in step 120. When the first client 10 has purchased the content and received content description in step 130, the first client 10 may request transmission of the content by transmitting the content description to the server 11.

According to an alternative embodiment of the present invention, the device information of the first client 10 may be transmitted along with the request for transmission of the content in step 140, instead of in step 110 or 120.

In step 150, the server 11 generates the application or contents requested in step 140. In detail, the server 11 generates the requested application or content with reference to the received device information of the first client 10, so that, when an application is requested, the requested application can be installed in and driven by the first client 10, or, when content is requested, the requested content can be reproduced by the first client 10.

The generated application may be an application package. Herein, the term "application package" refers to a combination of data that includes a file for executing the application and other data associated with the application. Also, the application package may be a file in which the data associated with the application is compressed. The application package may include the file for executing the application and at least one of a resource file of the application and metadata of the application.

The file for executing the application may include at least one of an execution file, a library, and a script generated by compiling a source or intermediate code. The resource file of the application is multimedia data displayed to the user when the application is executed and may include at least one of an icon file, an audio file, a video file, an image file, and a text file. The metadata of the application may include information describing characteristics of the application, such as a version, a producer, and/or a driving environment of the application.

The server 11 may dynamically generate at least one of the file for executing the application and the application package with reference to the device information.

An example of dynamically generating the file for executing the application according to an embodiment of the present invention is described as follows. The file for executing the application may be generated by compiling a source code of the purchased application with reference to the device information, so that the application can be installed in and driven by the first client 10.

According to an embodiment of the present invention, the server 11 may generate the file for executing the application by using an intermediate code, which is described in detail as follows with reference to FIG. 2.

Figure 2:
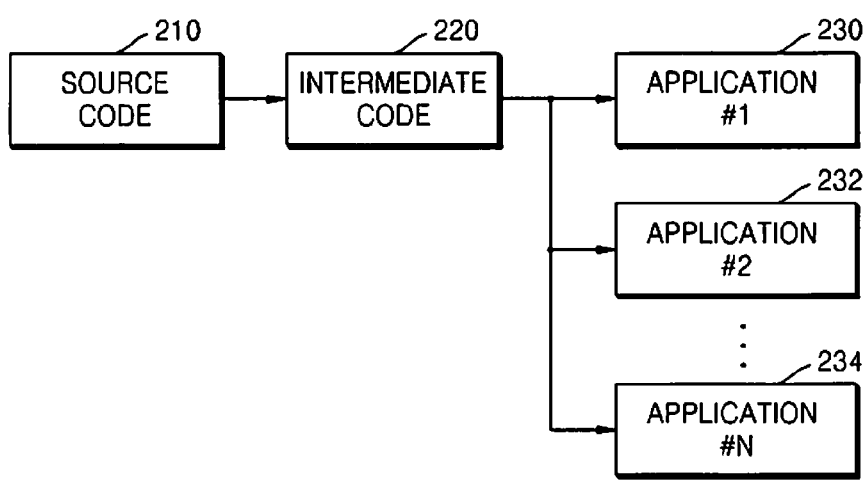
FIG. 2 is a block diagram illustrating a method for generating an application, according to an embodiment of the present invention.

FIG. 2 is a block diagram for describing a method for generating an application, according to an embodiment of the present invention.

Referring to FIG. 2, the server 11 may generate an intermediate code 220 by compiling a source code 210 of the application requested in step 140 by the first client 10. In this case, if the first client 10 requests for the application while the server 11 has the intermediate code 220, which is a code generated independently from a client type, the server 11 re-compiles the intermediate code 220 to generate an application, which can be installed in and driven by the first client 10, based on the device information of the first client 10.

Since a plurality of applications 230 to 234, which can be installed in and driven by various types of clients, are generated from an intermediate code of a single application, the server 11 can provide various applications, which correspond to the same source code 210, to the various types of clients.

An example of dynamically generating the application package according to an embodiment of the present invention is described as follows.

In step 150, the server 11 may generate the application package by referring to the device information. More specifically, the server 11 may dynamically generate the file for executing the application by referring to the device information of the first client 10 and dynamically generate the application package including the dynamically generated file for executing the application.

For example, an execution file, which can be executed and driven by the first client 10, may be generated by compiling a source or intermediate code of an application registered in the server 11 by a producer of the application, and an application package including the generated execution file may be generated. An application resource file (e.g., a wallpaper) may be selected to meet the hardware (e.g., resolution) of the first client 10, and an application package including the selected resource file may be generated. If a supporting language is Korean, an application package may be generated by selecting a resource file associated with the Korean language from among resource files corresponding to various languages.

Alternatively, an execution file, which can be executed and driven by the first client 10, may be selected based on the device information of the first client 10 from among a plurality of files for executing an application, which are previously generated to be installed in and driven by various devices, and an application package including the selected execution file may be dynamically generated.

For example, if an application producer registers a plurality of files for executing an application in the server 11, the server 11 may select an execution file, which can be executed and driven by the first client 10, from among the plurality of files for executing an application and dynamically generate an application package including the selected execution file.

Furthermore, the server 11 may dynamically generate content requested for by the first client 10 in step 150. Content that can be reproduced by the first client 10 may be dynamically generated based on the device information of the first client 10 received in step 110, 120, or 140. The server 11 may store an original content and, when the first client 10 requests the stored original content, may re-encode the original content to a content that can be reproduced by the first client 10 with reference to the device information of the first client 10.

For example, the server 11 may hold original motion picture data of a resolution higher than the display resolution of the first client 10 and, when the first client 10 requests for the content, the server may re-encode the original motion picture data according to the display resolution of the first device 10.

Referring back to FIG. 1, generation of the requested application or content in step 150 may be performed by an external server that is separate from the server 11. Alternatively, step 150 may be a selective operation in which a plurality of applications or a plurality of contents, which can be installed in and driven or reproduced by various devices, are previously stored in the server 11 before the first client 10 requests for transmission of an application or a content.

If the first client 10 requests transmission of an application or content when a plurality of application packages or contents that can be installed in and driven or reproduced by various devices are stored in a predetermined storage device, an application package or content corresponding to the device information of the first client 10 may be selected and transmitted. In this case, the plurality of application packages or the plurality of contents stored in the server 11 may be directly generated by an application producer or a content producer and registered in the server 11 instead of being generated by the server 11 so that the plurality of application packages or the plurality of contents can be installed in and driven or reproduced by various devices.

Referring back to FIG. 1, in step 160, the server 11 transmits, to the first client 10, the application or the content generated in step 150.

In this present example, a file for executing the application generated in step 150 may be transmitted. According to another embodiment of the present invention, an application package including the file for executing the application generated in step 150 may be transmitted to the first client 10.

Figure 3:
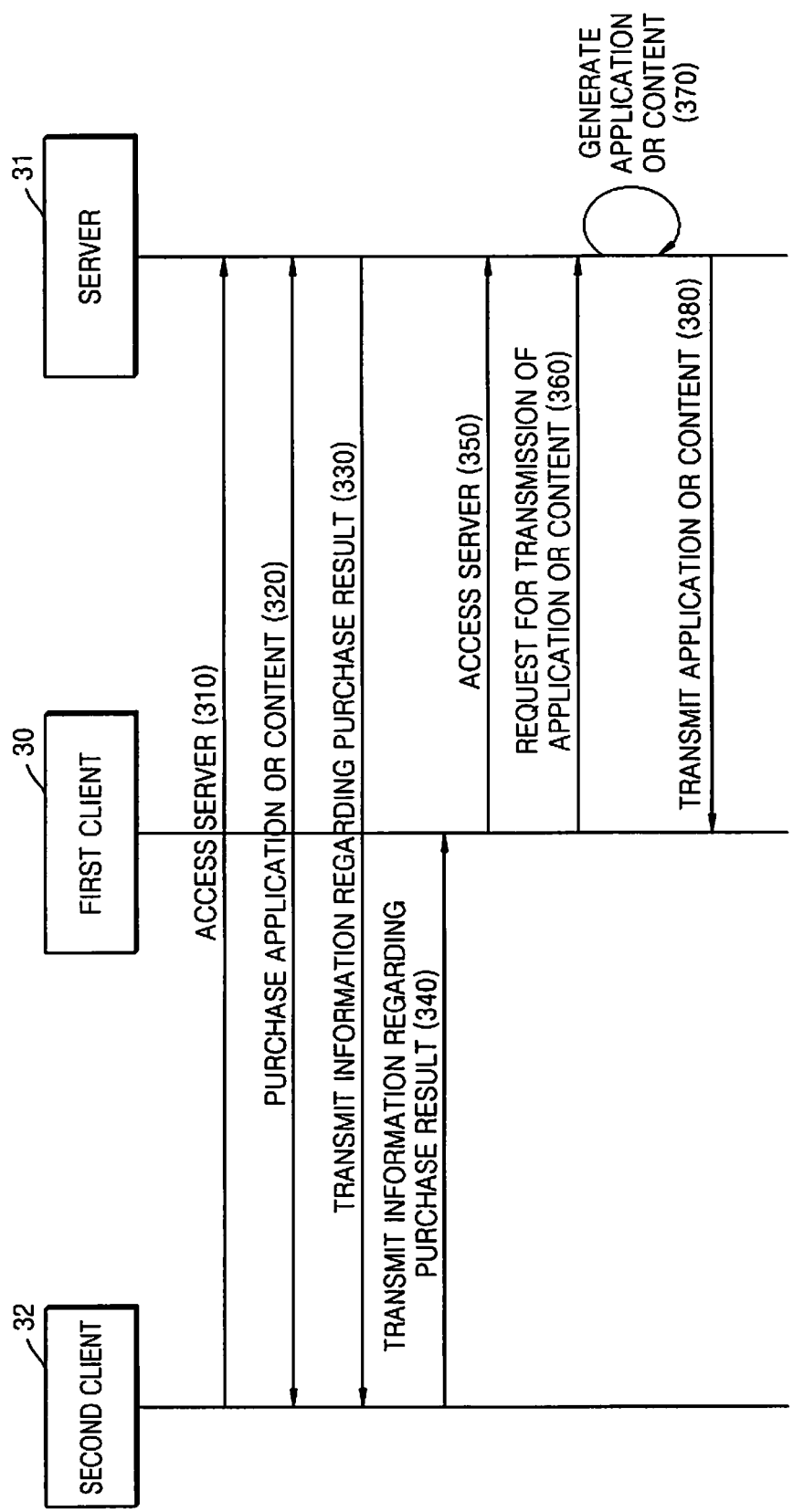
FIG. 3 is a signaling diagram illustrating a method for transmitting and receiving at least one of an application and content according to another embodiment of the present invention.

FIG. 3 is a signaling diagram illustrating a method for transmitting and receiving an application and/or content according to another embodiment of the present invention. More specifically, FIG. 3 illustrates a method for transmitting and receiving an application and/or content by sharing information regarding a purchase result between clients.

Referring to FIG. 3, in step 310, a second client 32 accesses a server 31 to purchase a predetermined application or a predetermined content.

In step 320, the second client 32 selects one of at least one application and/or at least one content provided by the server 31 and purchases the selected application or content.

In step 330, the server 31 transmits information regarding a purchase result of step 320 to the second client 32. Steps 310, 320, and 330 are performed in a manner similar to step 110, 120, and 130, respectively, of FIG. 1.

In step 340, the second client 32 transmits the information regarding the purchase result, which has been received in step 330, to a first client 30. As described above, the information regarding the purchase result may include all information for verifying that a user of the second client 32 has purchased the predetermined application or the predetermined content through proper procedures. The second client 32 transmits the information regarding the purchase result to the first client 30 to share the information regarding the purchase result with the first client 30 so that the first client 30 can use the application or the content purchased in step 320. Content description including information regarding the purchase result may also be transmitted to the first client 30.

The transmission of the information regarding the purchase result may be performed according to any of a variety of methods. For example, a network between the first client 30 and the second client 32 may be separately established to transmit and receive the information regarding the purchase result through the established network. Alternatively, the information regarding the purchase result may be transmitted through an already established network between first client 30 and the second client 32, such as a home network.

If the first client 30 and the second client 32 are located within a predetermined distance from each other, the information regarding the purchase result may be transmitted and received through a short distance wireless network, such as Radio Frequency Identification (RFID), Bluetooth, or Zigbee compliant networks.

In step 350, the first client 30 accesses the server 31 to request the purchased application or content. The first client 30 may access the server 31 by using the same account as used in step 310 by the second client 32. In addition, when the first client 30 accesses the server 31, the first client 30 may transmit device information of the first client 30 to the server 31.

In step 360, the first client 30 requests the server 31 to transmit the application or the content purchased in step 320, based on the information regarding the purchase result, which has been received in step 340. At this time, the information regarding the purchase result, which has been received in step 340, is transmitted to the server 31. If the first client 30 requests the server 31 to transmit the content, the content description received from the second client 32 in step 340 may be transmitted to the server 31. The device information of the first client 30 may alternatively be transmitted to the server 31 together with the information regarding the purchase result in step 360, instead of in step 350.

In step 370, the server 31 generates the application or content requested in step 360. Step 370 is performed in a manner similar to step 150 of FIG. 1 in which a file for executing the application and/or an application package may be dynamically generated or a content that can be reproduced by the first client 30 may be dynamically generated.

In step 380, the server 31 transmits the application or the content generated in step 370 to the first client 30. As described above, the application package including the file for executing the application may be transmitted.

Figure 4:
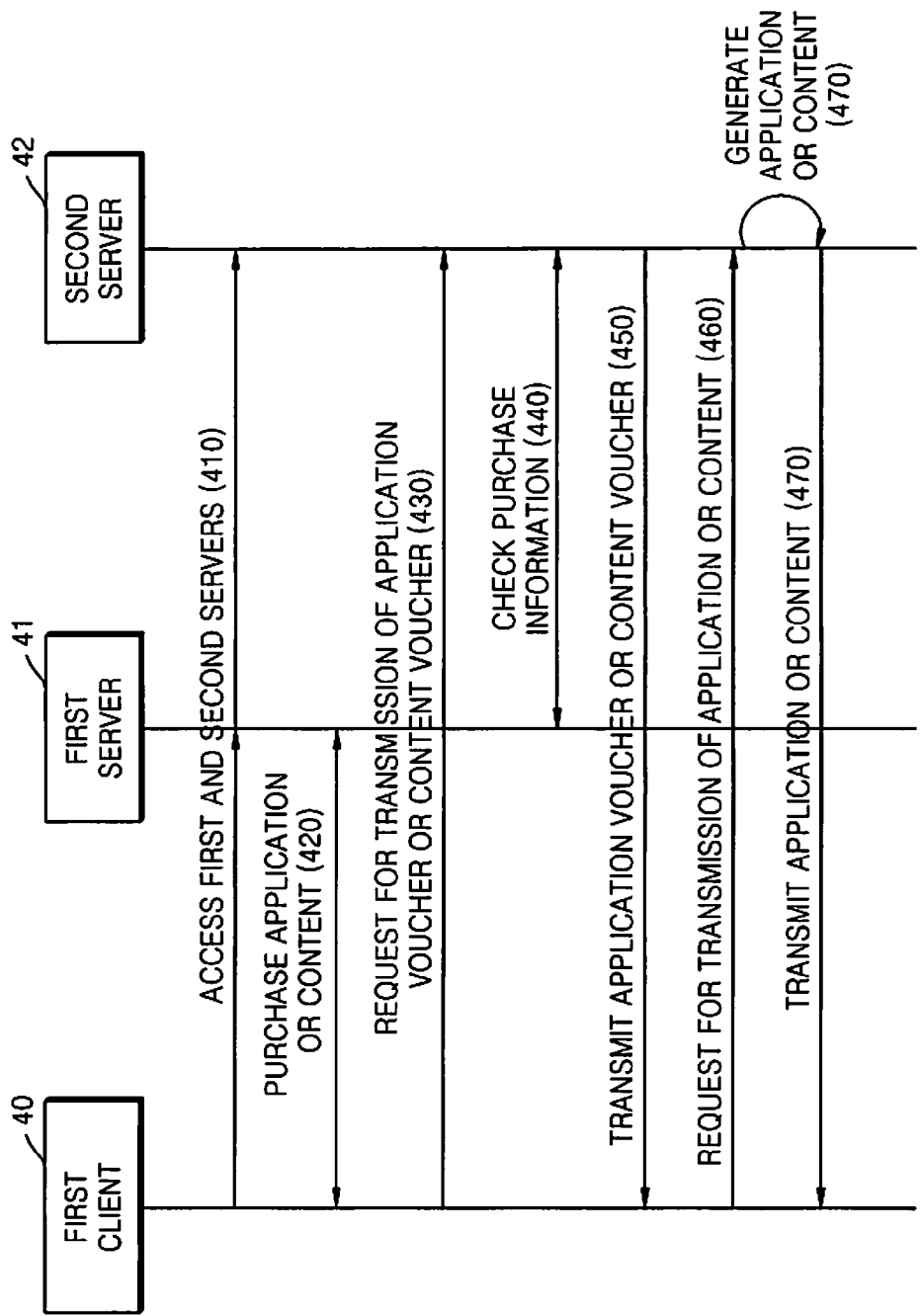
FIG. 4 is a signaling diagram illustrating a method for transmitting and receiving at least one of an application and content according to another embodiment of the present invention.

FIG. 4 is a signaling diagram illustrating a method for transmitting and receiving an application and/or content according to another embodiment of the present invention. More specifically, FIG. 4 illustrates a method for transmitting and receiving an application and/or content when the application and/or content are purchased and provided through different servers (i.e., a first server 41 and a second server 42), in a method for transmitting and receiving the application and/or content similar to that illustrated in FIG. 1. Although a plurality of servers are illustrated in FIG. 4, it is easily understood by those of ordinary skill in the art that a server for purchasing an application or a content and a server for providing the application or the content can be implemented by a single physical server in accordance with embodiments of the present invention.

In step 410, a first client 40 accesses the first server 41 and the second server 42 to purchase and receive a predetermined application or a predetermined content. The first client 40 may access the first server 41 and the second server 42 through logging-in with an account registered in the first server 41 and the second server 42, by a user of the first client 40. In a manner similar step 110 described herein with reference to FIG. 1, the first client 40 may also transmit device information of the first client 40 to the first server 41 and/or the second server 42 in step 410.

In step 420, the first client 40 selects one of at least one application and/or at least one content provided by the second server 42 and purchases the selected application or content. At this time, the first client 40 may request the first server 41 for a list of the at least one application and/or the at least one content provided by the second server 42, receive the list from the first server 41, and select an application or a content from the requested list.

If the user selects a predetermined application or a predetermined content, procedures for payment settlement are performed, and the user of the first client 40 may purchase the selected application or content through various payment settlement methods.

The first client 40 may transmit the device information of the first client 40 to the first server 41 in step 420 instead of step 410.

In step 430, the first client 40 requests the second server 42 to transmit an application voucher of the application purchased in step 420 (or a content voucher of the content purchased in step 420). The application voucher corresponds to the information regarding the purchase result, as described herein with reference to FIGS. 1 and 3. The first client 40 may also request a content description including the content voucher.

In step 440, the second server 42 accesses the first server 41 to determine whether the transmission request of the application voucher or the content voucher received from the first client 40 is proper. At this time, the second server 42 determines whether the first client 40 has purchased the application or the content, by searching for purchase information, which is stored in the first server 41, based on the account used when the first client 40 accesses in step 410. More specifically, the second server 42 determines whether the first client 40 has purchased the application by referring to the account stored in the first server 41 as the purchase information and a purchase history corresponding to the account.

In step 450, the second server 42 transmits information, i.e., the application voucher or the content voucher, regarding a purchase result of the application or the content, which has been purchased in step 420, based on a result of the determination performed in step 440.

In step 460, the first client 40 requests the second server 42 to transmit the application or the content, which has been purchased in step 420, based on the application voucher or the content voucher, which has been received in step 450. At this time, the first client 40 may transmit the application voucher or the content voucher, which has been received in step 450, to the second server 42. A content description including the content voucher may be transmitted to the second server 42.

If the device information of the first client 40 has not been transmitted to the first server 41 and/or the second server 42 in step 410, the first client 40 may transmit the device information of the first client 40 together with the application voucher or the content voucher to the second server 42 in step 460.

In step 470, the second server 42 generates an application, which can be installed in and driven by the first client 40, based on the device information of the first client 40 received in step 410, 420, or 460. Step 470 is performed in a manner similar to step 150 described herein with reference to FIG. 1, in which a file for executing the application and/or an application package may be dynamically generated. Similarly, content that can be reproduced by the first client 40 may be dynamically generated.

In step 480, the second server 42 transmits the application or content generated in step 470 to the first client 40. As described above, the application may be transmitted to the first client 40 in the form of an application package including a file for executing the application.

Figure 5:
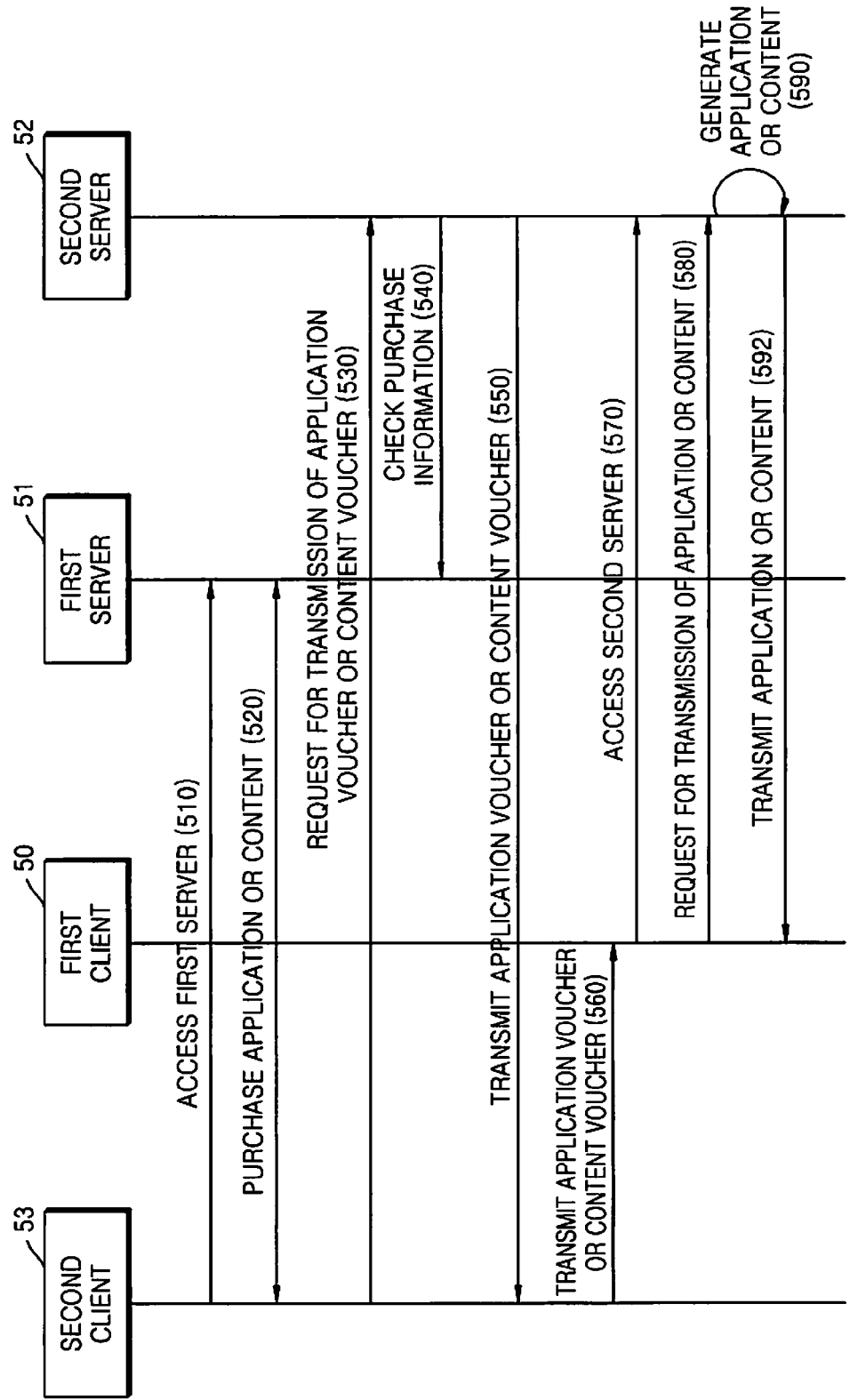
FIG. 5 is a signaling diagram illustrating a method for transmitting and receiving at least one of an application and content according to another embodiment of the present invention.

FIG. 5 is a signaling diagram illustrating a method for transmitting and receiving at least one of an application and content according to another embodiment of the present invention. More specifically, FIG. 5 illustrates a method for transmitting and receiving at least one of an application and content when the application and/or content is purchased and provided through different servers, i.e., a first server 51 and a second server 52, in a manner similar to the method for transmitting and receiving at least one of an application and content described herein with reference to FIG. 3. Although a plurality of servers are illustrated in FIG. 5, it is easily understood by those of ordinary skill in the art that a server for purchasing an application or a content and a server for providing the application or the content can be implemented by a single physical server in accordance with embodiments of the present invention.

Referring to FIG. 5, in step 510, a second client 53 accesses the first server 51 to purchase a predetermined application or a predetermined content. At this time, the second client 53 may access the first server 51 by logging-in with an account registered in the first server 51 by a user of the second client 53.

In step 520, the second client 53 selects one of at least one application and/or at least one content provided by the second server 52 and purchases the selected application or content.

In step 530, the second client 53 requests the second server 52 to transmit an application voucher or a content voucher of the application or the content purchased in step 520. Steps 510, 520, and 530 are performed in a manner similar to steps 410, 42, and 430, respectively, described herein with reference to FIG. 4. A content description including the content voucher may also be requested.

In step 540, the second server 52 accesses the first server 51 to determine whether the transmission request of the application voucher or the content voucher, which has been received from the second client 53, is a proper request. At this time, the second server 52 determines whether the second client 53 has purchased the application or the content, by searching for purchase information, which is stored in the first server 51, based on the account used when the second client 53 accesses the first server 51 in step 510.

In step 550, the second server 52 transmits information (i.e., the application voucher or the content voucher) regarding a purchase result of the purchased application or content, based on a result of the determination performed in step 540. A content description including the content voucher may also be transmitted.

In step 560, the second client 53 transmits the received application voucher or content voucher to the first client 50. At this time, the second client 53 transmits the received application voucher or content voucher, to the first client 50, to share the purchase information with the first client 50, so that the first client 50 can use the application or the content purchased by the second client 53. A content description including the content voucher may also be transmitted to the first client 50.

In step 570, the first client 50 accesses the second server 52 to request the purchased application or content. At this time, the first client 50 may access the second client 53 by using the same account as used in step 510 by the second client 53 to access the second server 52. When the first client 50 accesses the second server 52, the first client 50 may transmit device information of the first client 50 to the second server 52.

In step 580, the first client 50 requests the second server 52 to transmit the purchased application or content, based on the received application voucher or content voucher. At this time, the first client 50 may transmit the received application voucher or content voucher to the second server 52. According to an alternative embodiment of the present invention, the first client 50 may transmit the device information of the first client 50 together with the application voucher or content voucher to the second server 52 in step 580 instead of step 570. The content purchased in step 520 may be requested by transmitting a content description including the content voucher to the second server 52.

In step 590, the second server 52 generates an application, which can be installed in and driven by the first client 50, based on the received device information of the first client 50. Step 590 is performed in a manner similar to step 150 described herein with reference to FIG. 1, in which a file for executing the application and/or an application package may be dynamically generated. Alternatively, if content is purchased, content that can be reproduced by the first client 50 may be dynamically generated based on the received device information of the first client 50.

In step 592, the second server 52 transmits the application or the content generated in step 590 to the first client 50. As described above, the application package including the file for executing the application may be transmitted.

Figure 6:
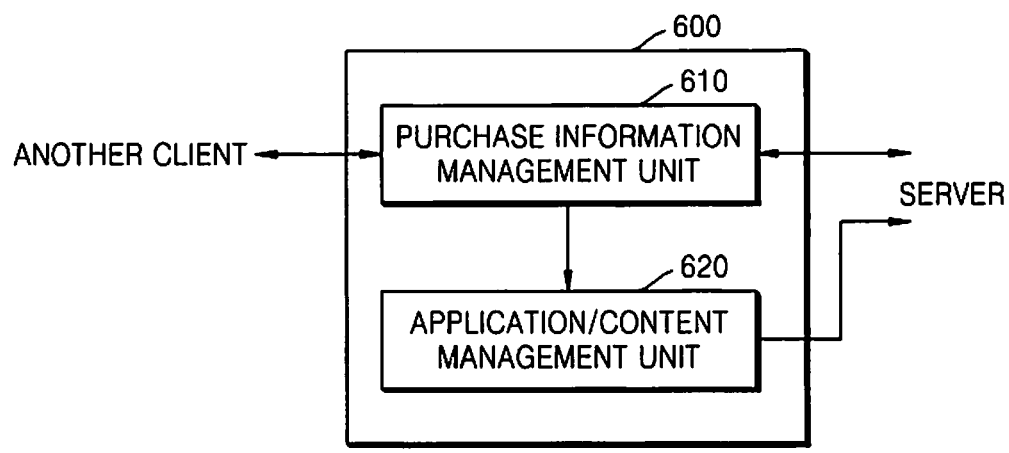
FIG. 6 is a block diagram illustrating an apparatus for receiving at least one of an application and content in a client, according to an embodiment of the present invention.

FIG. 6 is a block diagram illustrating an apparatus for receiving at least one of an application and content in a client, according to an embodiment of the present invention.

Referring to FIG. 6, an apparatus 600 for receiving at least one of an application and content includes a purchase information management unit 610 and an application/content management unit 620.

The purchase information management unit 610 receives information regarding a purchase result of a predetermined application or a predetermined content from a server or another client. If the predetermined application or content is purchased by directly accessing the server through the client including the apparatus 600, the information regarding the purchase result of the application or the content is received from the server; otherwise if the application or the content is purchased through another client, the information regarding the purchase result is received from the other client. As described above, the information regarding the purchase result may include information for verifying that a user of the apparatus 600 has purchased the predetermined application or the predetermined content through proper procedures, and this verification information may be in the form of an application voucher or a content voucher. The content voucher may also be included in a content description.

The application/content management unit 620 requests the server to transmit the predetermined application or content, based on the information regarding the purchase result received from the purchase information management unit 610, and receives the application or the content from the server in response to the request. Transmission of the predetermined content may be requested by transmitting a content description including the content voucher to the server. When transmission of the application or the content is requested, device information of the client 10, 30, 40, or 50 (as described herein with reference to FIGS. 1 through 5) including the apparatus 600 may also be transmitted. The server generates an application by compiling a source or intermediate code of the application according to the transmitted device information so that the application can be installed in and driven by the client 10, 30, 40, or 50 and transmits the generated application to the application/content management unit 620. The application may be an application package including a file for executing the application. Alternatively, if content is purchased, the server may re-encode the purchased content so that the content may be reproduced by the client 10, 30, 40, or 50 and may transmit the re-encoded content to the application/content management unit 620.

When the application/content management unit 620 requests the transmission of the application or the content, the application/content management unit 620 may access the server by using the same account as a user account used to purchase the application or the content and transmit, to the server, the information regarding the purchase result and the device information of the client 10, 30, 40, or 50. By accessing the server by using the same account as the user account used to purchase the application or the content, a server for providing the application or the content may check a purchase history corresponding to the user account to determine whether to server generate an application and/or content.

Figure 7:
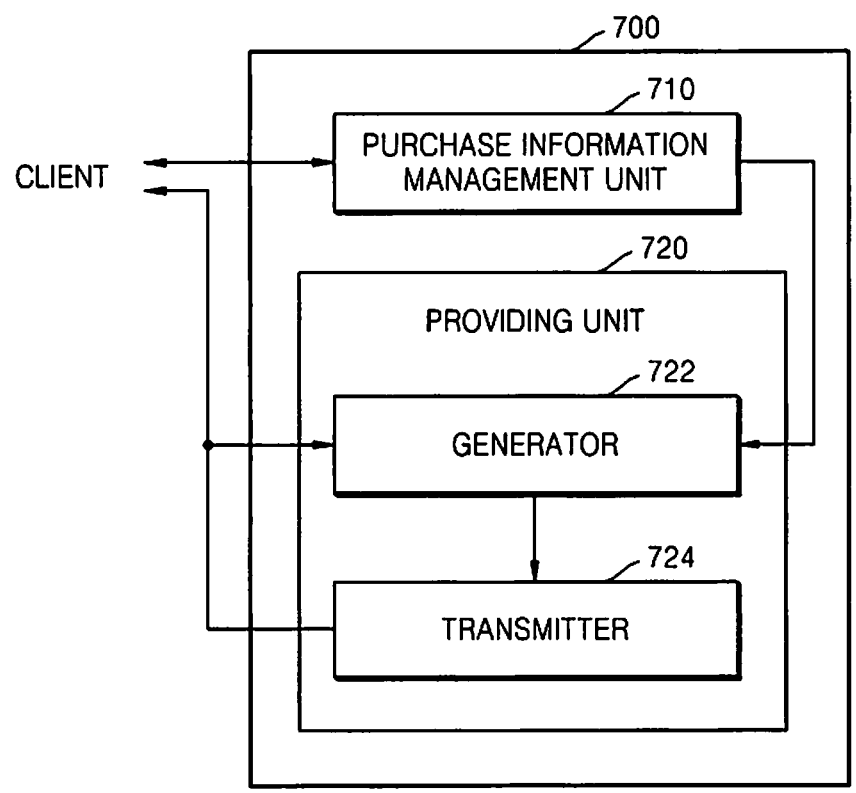
FIG. 7 is a block diagram illustrating an apparatus for providing at least one of an application and a content in a server, according to an embodiment of the present invention.

FIG. 7 is a block diagram illustrating an apparatus for providing at least one of an application and content in a server, according to an embodiment of the present invention.

Referring to FIG. 7, an apparatus 700 for providing at least one of an application and content includes a purchase information management unit 710 and a providing unit 720, which includes a generator 722 and a transmitter 724.

The purchase information management unit 710 transmits information regarding a purchase result to a client in response to a request from the client. More specifically, if the first client 10 or the second client 32 (described herein with reference to FIGS. 1 and 3), which has purchased an application or a content, requests information regarding a purchase result, the purchase information management unit 710 transmits the information regarding the purchase result for the first client 10 or the second client 32, which will use this information for a request to transmission the purchased application or content.

The purchase information management unit 710 also receives the information regarding the purchase result as a transmission request of the application or the content from the first client 10 or 30, which has the information regarding the purchase result. Alternatively, if content is purchased, a content description including information regarding the purchase result of the purchased content may be received. More specifically, a device, i.e., the first client 10 of FIG. 1, which has directly received a purchase result from a server, may request transmission of an application or content (or a device, i.e., the second client 32 of FIG. 3, which has received a purchase result from another client 32), may request for transmission of an application or content.

The providing unit 720 receives device information of the first client 10 or the first client 30 from the first client 10 or the first client 30 and provides an application or content based on the received device information and the information regarding the purchase result, which has been received from the purchase information management unit 710. More specifically, the application providing unit 720 determines based on the information regarding the purchase result, which has been received from the purchase information management unit 710, whether the application or the content is provided and provides the application, which can be installed in and driven by the first client 10 or the first client 30, based on the received device information of the first client 10 or the first client 30, or the content, which can be reproduced by the first client 10 or the first client 30.

The generator 722 generates an application that can be installed in and driven by the first client 10 or the first client 30, based on the device information received from the first client 10 or the first client 30, or content that can be reproduced by the first client 10 or the first client 30. More specifically, the generator 722 generates the application can be installed in and driven by the first client 10 or the first client 30, by compiling a source or intermediate code of the application based on the device information, or generates the content that can be reproduced by the first client 10 or the first client 30.

The transmitter 724 transmits the application or the content generated by the application generator 722 to the first client 10 or the first client 30. The transmitter 724 may transmit an application package including a file for executing the application to the first client 10 or the first client 30. According to an embodiment of the present invention, the transmitter 724 may hold a plurality of applications or a plurality of contents that may be used in various devices in advance and may select and transmit an application or a content that may be used by the client 10 or 30 based on the device information received by the purchase information management unit 710.

Figure 8:
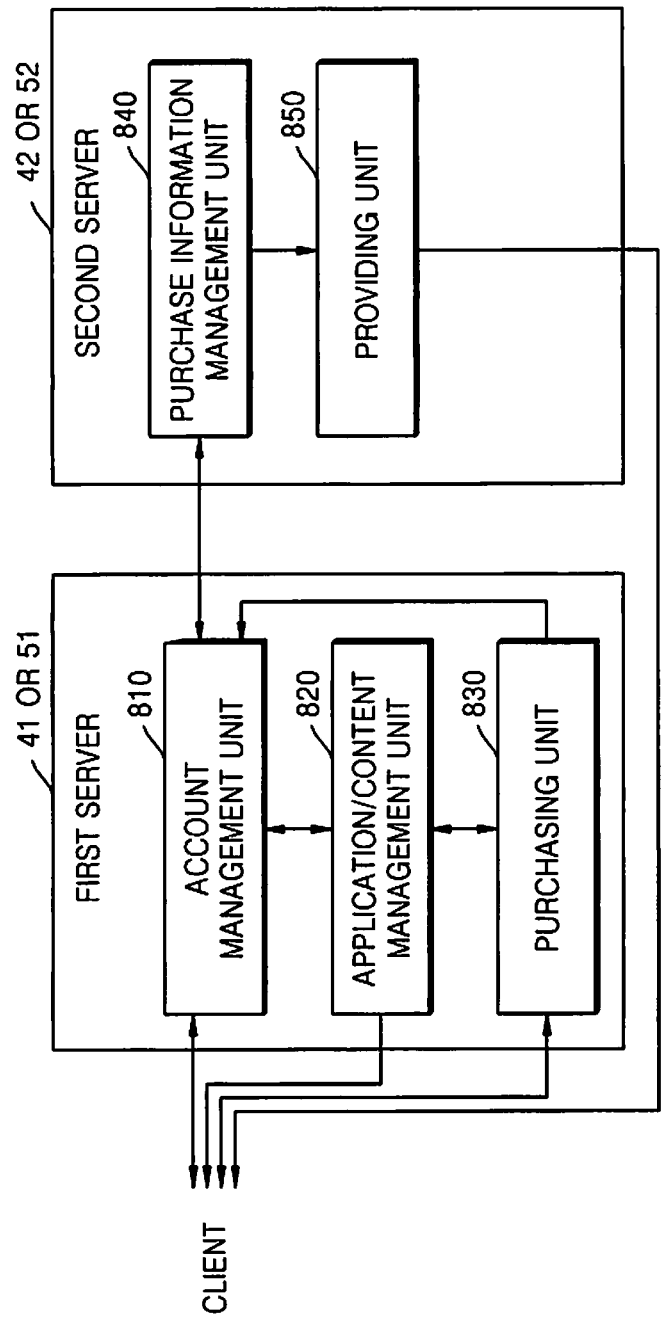
FIG. 8 is a block diagram illustrating a server for purchasing at least one of an application and content and a server for providing at least one of the application and content, according to an embodiment of the present invention.

FIG. 8 is a block diagram illustrating a server for purchasing at least one of an application and content and a server for providing at least one of the application and the content according to an embodiment of the present invention. More specifically, FIG. 8 illustrates two different servers according to an example an application and/or content are purchased and provided through the two different servers described herein with reference to FIGS. 4 and 5. Although a plurality of servers are shown in FIG. 8, it is easily understood by those of ordinary skill in the art that a server for purchasing an application or a content and a server for providing the application or the content can be implemented by a single physical server in accordance with embodiments of the present invention.

Referring to FIG. 8, the first server 41 or 51 for purchasing an application or content includes an account management unit 810, an application/content management unit 820, and a purchasing unit 830. The second server 42 or 52 includes a purchase information management unit 840 and a providing unit 850.

The account management unit 810 manages registration of a user account and logging-in using the user account. More specifically, the account management unit 810 controls access of clients to the first server 41 or 51 by registering user accounts and passwords.

The account management unit 810 also manages an application purchase history or a content purchase history of a client. More specifically, the account management unit 810 stores each user account and a purchase history corresponding to each user account so that the second server 42 or 52 can refer to the stored information.

The application/content management unit 820 provides information regarding applications or contents, which is provided by the second server 42 or 52, to the client 40 or 53. More specifically, the application/content management unit 820 provides a list of applications or a list of contents, which is provided by the second server 42 or 52, to the client 40 or 53. In this case, the application/content management unit 820 may receive device information corresponding to the client 40 or 53 from the account management unit 810 and provide a list of applications, which can be installed in and driven by the client 40 or 53, or a list of contents, which can be reproduced by the client 40 or 53, to the client 40 or 53 based on the received device information.

The purchasing unit 830 controls application purchase procedures or content purchase procedures corresponding to requests from the client 40 or 53. More specifically, when the client 40 or 53 selects a predetermined application or predetermined content based on the list transmitted from the application/content management unit 820, the purchasing unit 830 performs payment settlement procedures corresponding to the selected application or the selected content.

Upon completion of the payment settlement procedures, the purchasing unit 830 transmits a purchase result to the account management unit 810 to update a purchase history of the client 40 or 53.

The purchase information management unit 840 transmits information regarding a purchase result to a client in response to a request of the client. More specifically, when the first client 40 or the second client 53, which has purchased an application or content, requests information regarding a purchase result, the purchase information management unit 840 transmits the information regarding the purchase result to the first client 40 or the second client 53 so that the first client 40 or the second client 53 can use this information for a request to transmit the purchased application or content. A content description including information regarding the purchase result of the content may also be transmitted to the first client 40 or the second client 53.

The purchase information management unit 840 also receives the information regarding the purchase result as a transmission request of the application or the content from the first client 40 or 50, which has the information regarding the purchase result. More specifically, a device that has directly received a purchase result from a server (i.e., the first client 40), may request transmission of a purchased application or content. Alternatively, a device (that has received a purchase result from another client 53 (i.e., the first client 50), may request transmission of a purchased application or content.

The application providing unit 850 receives device information of the client 40 or 50 from the client 40 or 50 and provides an application or content based on the received device information and the information regarding the purchase result, which has been received from the purchase information management unit 840. More specifically, the providing unit 850 determines, based on the received information regarding the purchase result, whether to provide the requested application or content, and provides an application that can be installed in and driven by the client 40 or 50, or content that can be reproduced by the client 40 or 50, based on the received device information of the client 40 or 50. As described with reference to FIG. 7, the providing unit 850 may generate the application that can be installed in and driven by the client 40 or 50, based on the device information received from the client 40 or 50 and transmit the generated application to the client 40 or 50.

According to embodiments of the present invention, since an application or a content purchased by a user can be used in a plurality of different clients, the purchase and use of applications/contents of the user can be promoted. In addition, since a single application can be sold to users of various clients by using an intermediate code independent from a specific client, application developers may be lead to produce applications.

While embodiments of the invention are shown and described herein with reference to particular embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention. In addition, a system according to the present invention can be implemented as computer-readable codes in a computer-readable recording medium.

For example, an application receiving apparatus and an application providing apparatus according to an embodiment of the present invention may include a bus connected with each unit of the apparatuses shown in FIGS. 6, 7, and 8 and at least one processor connected with the bus. In addition, a memory connected with the at least one processor may be included to perform commands by being coupled with the bus to store the commands, received messages, and generated messages.

The term "computer-readable recording medium" herein refers to any data storage device that can store data that can be thereafter read by a computer system. Examples of the computer-readable recording medium include Read-Only Memory (ROM), Random-Access Memory (RAM), Compact Disc (CD)-ROMs, magnetic tapes, floppy disks, optical data storage devices, etc. Computer-readable recording mediums according to embodiments of the present invention may also be distributed over network-coupled computer systems so that the computer-readable code is stored and executed in a distributed fashion.

What is claimed is:

1. A method for receiving at least one of an application and content by a first client, the method comprising:
   receiving, by a hardware processor of the first client, information regarding a purchase result of the at least one of the application and the content, from a second client that purchases the at least one of the application and the content from a first server and receives the purchase result from a second server;
   transmitting, by the hardware processor, the information regarding the purchase result and device information of the first client to the second server providing the at least one of the application and the content; and
   receiving, by the hardware processor, the at least one of the application and the content from the second server, in response to the transmitted information regarding the purchase result and the device information,
   wherein the second server transmits, to the first client, a list of applications that can be installed in and driven by the first client or a list of content that can be reproduced by the first client, with reference to the device information of the first client, which has been received from the first client, and
   wherein the second server compiles a source code and generates an intermediate code, which is a device independent code of the at least one of the application and the content based on the device information of the first client, independently from a client type, and recompiles the intermediate code to generate an application, which can be installed in and driven by the first client based on the device information of the first client.

2. The method of claim 1, wherein receiving the at least one of the application and the content includes receiving an application package, and
   wherein the application package includes a file for executing the application, and at least one of a resource file of the application and metadata of the application.

3. The method of claim 2, wherein the application package is dynamically generated by the second server based on the device information of the first client.

4. The method of claim 3, wherein the file for executing the application is generated by compiling the source code of the application in the second server based on the device information of the first client such that the application can be driven by the first client.

5. The method of claim 3, wherein the file for executing the application is generated by compiling the intermediate code that is generated by compiling the source code of the application, based on the device information of the first client so that the application can be driven by the first client.

6. The method of claim 3, wherein the file for executing the application is selected based on the device information of the first client from among a plurality of files for executing the application, and
wherein the plurality of files are registered in the second server by a producer of the application such that the application can be driven by various devices.

7. The method of claim 2, wherein the application package is selected based on the device information of the first client from among a plurality of application packages registered in the second server by a producer of the application such that the application can be driven by various devices.

8. The method of claim 2, wherein the file for executing the application includes at least one of an execution file, a library, and a script.

9. The method of claim 2, wherein the resource file of the application includes at least one of an icon file, an audio file, a video file, an image file, and a text file.

10. A method for providing at least one of an application and content by a second server, the method comprising:
receiving, by a hardware processor of the second server, from a first client, information regarding a purchase result of the at least one of the application and the content and device information of the first client, wherein the first client received the information regarding the purchase result from a second client that purchases the at least one of the application and the content from a first server and receives the purchase result from the second server; and
transmitting, by the hardware processor, the at least one of the application and the content to the first client in response to the received information regarding the purchase result and the device information,
wherein the second server transmits, to the first client, a list of applications that can be installed in and driven by the first client or a list of content that can be reproduced by the first client, with reference to the device information of the first client, which has been received from the first client, and
wherein the second server compiles a source code and generates an intermediate code, which is a device independent code of the at least one of the application and the content based on the device information of the first client, independently from a client type, and recompiles the intermediate code to generate an application, which can be installed in and driven by the first client based on the device information of the first client.

11. The method of claim 10, wherein transmitting the at least one of the application and the content includes transmitting an application package, and
wherein the application package includes a file for executing the application, and at least one of a resource file of the application and metadata of the application.

12. The method of claim 11, wherein the application package is dynamically generated by the second server based on the device information of the first client.

13. The method of claim 12, wherein the file for executing the application is generated by compiling the source code of the application in the second server based on the device information of the first client such that the application can be driven by the first client.

14. The method of claim 12, wherein the file for executing the application is generated by compiling the intermediate code that is generated by compiling the source code of the application, based on the device information of the first client so that the application can be driven by the first client.

15. The method of claim 12, wherein the file for executing the application is selected based on the device information of the first client from among a plurality of files for executing the application, and
wherein the plurality of files are registered in the second server by a producer of the application so that the application can be driven by various devices.

16. The method of claim 11, wherein the application package is selected based on the device information of the first client from among a plurality of application packages registered in the second server by a producer of the application such that the application can be driven by various devices.

17. An apparatus of a first client for receiving at least one of an application and content, the apparatus comprising:
a hardware processor configured to receive, from a second client, information regarding a purchase result of the at least one of the application and the content, wherein the second client requested and received the information from a second server after purchasing the at least one of the application and the content from a first server, transmit the information regarding the purchase result and device information of the first client to the second server, and receive the at least one of the application and the content from the second server in response to the transmitted information regarding the purchase result and the device information,
wherein the second server transmits, to the first client, a list of applications that can be installed in and driven by the first client or a list of content that can be reproduced by the first client, with reference to the device information of the first client, which has been received from the first client, and
wherein the second server compiles a source code and generates an intermediate code, which is a device independent code of the at least one of the application and the content based on the device information of the first client, independently from a client type, and recompiles the intermediate code to generate an application, which can be installed in and driven by the first client base don the device information of the first client.

18. The apparatus of claim 17, wherein the processor receives an application package, and
wherein the application package includes a file for executing the application, and at least one of a resource file of the application and metadata of the application.

19. An apparatus of a second server for providing at least one of an application and content, the apparatus comprising:
a hardware processor configured to receive information regarding a purchase result regarding the at least one of the application and the content from a first client, wherein the first client received the information regarding the purchase result from a second client that purchases the at least one of the application and the content from a first server and receives the purchase result from the second server, and transmit the at least one of the application and the content to the first client in response to the received information regarding the purchase result and device information of the first client, wherein the second server transmits, to the first client, a list of applications that can be installed in and driven by the first client or a list of content that can be reproduced by the first client, with reference to the device information of the first client, which has been received from the first client, and wherein the second server compiles a source code and generates an intermediate code, which is a device independent code of the at least one of the application and the content based on the device information of the first client, independently from a client type, and recompiles the intermediate code to generate an application, which can be installed in and driven by the first client based on the device information of the first client.

20. The apparatus of claim 19, wherein the processor transmits an application package, and the application package includes a file for executing the application, and at least one of a resource file of the application and metadata of the application.

21. A non-transitory computer-readable recording medium storing a computer-readable program for executing the method of claim 1.

22. A non-transitory computer-readable recording medium storing a computer-readable program for executing the method of claim 10.

* * * * *